United States Patent [19]

Fiebig

[11] Patent Number: 5,539,297
[45] Date of Patent: Jul. 23, 1996

[54] CHARGING DEVICE FOR CHARGING A PLURALITY OF BATTERIES BASED ON PARAMETER PRIORITY

[75] Inventor: Arnim Fiebig, Leinfelden-Echterdingen, Germany

[73] Assignee: Robert Bosch GmbH, Stuttgart, Germany

[21] Appl. No.: 318,799

[22] PCT Filed: Apr. 22, 1993

[86] PCT No.: PCT/DE93/00350

§ 371 Date: Oct. 17, 1994

§ 102(e) Date: Oct. 17, 1994

[87] PCT Pub. No.: WO93/23905

PCT Pub. Date: Nov. 25, 1993

[30] Foreign Application Priority Data

May 15, 1992 [DE] Germany .......................... 42 16 045.6

[51] Int. Cl.[6] .............................. H01M 10/44; H02J 7/00
[52] U.S. Cl. .................. 320/15; 320/16; 320/48; 320/49
[58] Field of Search .................. 429/99–100; 320/15, 320/18, 39, 48, 20, 21, 49

[56] References Cited

U.S. PATENT DOCUMENTS

| 3,940,679 | 2/1976 | Brandwein et al. | 320/48 |
|---|---|---|---|
| 4,849,682 | 7/1989 | Bauer et al. | 320/15 |
| 5,055,763 | 10/1991 | Johnson et al. | 320/15 |
| 5,122,722 | 6/1992 | Goedken et al. | 320/22 |
| 5,149,604 | 9/1992 | Nakanishi | 320/97 |
| 5,326,651 | 7/1994 | Mehta et al. | 429/96 |
| 5,365,160 | 11/1994 | Leppo et al. | 320/22 |
| 5,463,305 | 10/1995 | Koenck | 320/21 |
| 5,471,129 | 11/1995 | Mann | 320/2 |

Primary Examiner—Peter S. Wong
Assistant Examiner—Gregory Toatley
Attorney, Agent, or Firm—Michael J. Striker

[57] ABSTRACT

The charging device for charging a plurality of rechargeable batteries according to the invention includes at least two sensors associated with each rechargeable battery for measuring a measurable parameter, e.g. voltage, temperature, etc, of the rechargeable battery associated therewith; switchable devices for electrically connecting one or more rechargeable batteries at a time for charging; a control device for selecting rechargeable batteries for charging in an order determined by measured values of the measurable parameters obtained from the sensors associated with each rechargeable battery. The control device includes a device for weighting the measured parameters of each of the rechargeable batteries according to a priority factor to obtain weighted combined values, a device for comparing said weighted combined values to at least one predetermined limiting value to determine the order in which the rechargeable batteries are selected for charging and a device for controlling the switchable device to connect the rechargeable batteries for charging according to that order.

9 Claims, 4 Drawing Sheets

CHARGING DEVICE FOR CHARGING A PLURALITY OF BATTERIES BASED ON PARAMETER PRIORITY

BACKGROUND OF THE INVENTION

The present invention relates to a charging device for a plurality of rechargeable batteries and, more particularly, to a battery charging device in which the order of battery charging is based on a priority parameter. A known charging device, also known as a universal charging device, can receive nickel-cadmium batteries of different shapes and voltage, for example. This charging device requires several hours to charge batteries. The charging process is interrupted only when the batteries to be charged have reached a determined nominal voltage. The lengthy charging time is due to a relatively low charging current. However, this low charging current is required to prevent excessive heating of and consequent damage to the batteries.

A quick-charging device which can charge a battery in a few minutes is also already known. To protect the battery from thermal overloading, the charging process makes use of a relatively costly control method in which the charging process is monitored by measuring the charging voltage and the battery temperature at the same time. This control method is optimized for a determined type of battery and must be readapted when changing to a battery type with a different capacity. This process is undesirable for the user.

SUMMARY OF THE INVENTION

It is an object of the present invention to provide an improved charging device for a plurality of rechargeable batteries which does not have the above-described disadvantages.

It is another object of the present invention to provide a charging device for a plurality of rechargeable batteries which is more versatile than prior art battery charging devices and which can rapidly charge a greater variety of different types of rechargeable batteries automatically without operator intervention.

According to the invention the charging device for charging a plurality of rechargeable batteries includes a plurality of battery chambers, each of which can hold a rechargeable battery, at least two sensors associated with each rechargeable battery, each of the at least two sensor devices including means for measuring a measurable parameter of its associated rechargeable battery, switchable means for electrically connecting at least one rechargeable battery at a time for charging and control means for selecting rechargeable batteries for charging in an order determined by measured values of the measurable parameters obtained from the at least two sensors associated with each rechargeable battery. The control means includes means for weighting the measured parameters of each rechargeable battery according to a priority factor to obtain weighted combined values, means for comparing the weighted combined values of the measured parameters to at least one predetermined limiting value to determine the order in which the rechargeable batteries are charged and means for controlling the switchable means to connect the rechargeable batteries for charging according to that order.

The charging device according to the invention has the advantage over the prior art that batteries of any capacity can be charged very quickly and without intervention on the part of the user, since the next battery to be charged can be switched to automatically after a predetermined limiting value is reached. By weighting the measurement parameters with a priority parameter, the charging process can be controlled in a very simple manner and the battery is protected against damage, e.g., due to overheating or overcharging. For example, if the temperature measurement of the first battery has the highest priority in a quick-charging process, the charging process is interrupted, regardless of the charge level, when a predetermined temperature limit is reached. During the cooling off period for this battery, the next battery to be charged is switched to and charged. Thus, a plurality of batteries are charged within a relatively short period of time by cyclical switching between batteries. Moreover, since a limited charging current is applied only to one battery at a time, the charging device can be constructed in a relatively compact manner. Accordingly, its manufacture is particularly economical.

In a preferred embodiment of the invention the switchable means for electrically connecting the at least one rechargeable battery at a time for charging includes means for connecting all rechargeable batteries in parallel for charging and the control means includes means for interrogating the sensors of each rechargeable battery one after the other to obtain the measured parameters for each rechargeable battery. A particularly fast charging of all batteries is achieved when the batteries are charged by the charging device at the same time and until the control unit determines that a limiting value has been exceeded. For example, if a battery has become too warm during the charging process, it is periodically switched off until its temperature has dropped below the limiting value. It can then be switched on again until its charging voltage is reached.

A further advantage results when a battery chamber not containing a battery to be charged is switched off or skipped by the control means. This reduces the time required for the total charging process.

It is desirable to monitor battery voltage or battery temperature because the battery can be damaged if the limiting values are exceeded. Since a nickel-cadmium battery starts to generate gas particularly at high temperatures, the occurring internal pressure can cause the battery to explode. Therefore, it is particularly advantageous to monitor the battery temperature, especially when quick charging is carried out.

In a particularly preferred embodiment of the invention the control means controls the charging process so that batteries are charged one after the other and the priority factor essentially acts to select between two methods of determining the order of charging the batteries: (1) in increasing order of battery voltage starting with the battery having the lowest voltage or (2) in increasing order of battery temperature starting with the battery having the lowest temperature. This latter method is used particularly for quick-charging of the batteries when a quick-charging power supply (6) is included in the charging device.

Another advantage results when the charging device is constructed as a compact pocket-size device. Accordingly, it is as readily portable as the battery itself.

In an advantageous embodiment of the invention, an indicator is provided for every battery chamber. Such an indicator, which is constructed as a LCD or LED, requires little current and provides the user of the charging device with an immediate indication about the charge state and parameters of the battery.

The charging device can be used particularly for nickel-cadmium batteries, since these batteries can be recharged often at relatively high charging currents and are consequently used in many battery-powered devices.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
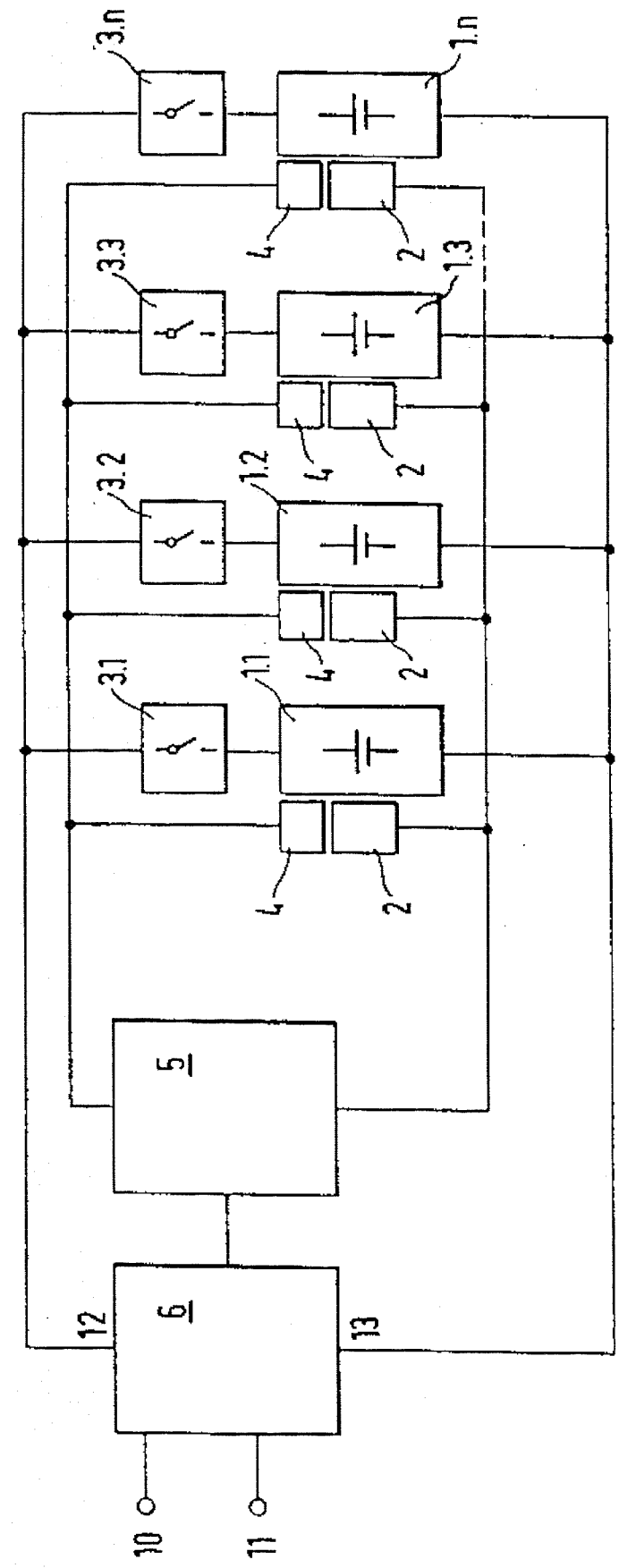
FIG. 1 is a block diagram of a device for charging a group of rechargeable batteries according to the invention.

A block diagram of a preferred embodiment of a charging device according to the invention is shown in FIG. 1.

FIG. 1 shows a DC power supply unit 6 which is connected via connections 10, 11 with a supply voltage, e.g., an AC power supply 60. The power supply unit has components, known per se, such as a transformer for transforming voltage, a rectifier and a voltage regulator or current regulator, which limit the charging current for the batteries at terminals 12, 13 to an allowed value. A number of circuit branches consisting of an electronically controllable switch device 3.1, 3.2, 3.3, 3.n connected in series with a battery chamber 1.1, 1.2, 1.3, 1.n are connected in parallel via conductors 112, 113 across the output terminals 12, 13 of the DC power supply. The switch devices 3.1, 3.2, 3.3, 3.n contain controllable switches such as reed contacts, relays or semiconductor switches, e.g., transistors or thyristors. The switch devices 3.1, 3.2, 3.3, 3.n are controlled by a control unit 5 via lines 50.1, 50.2, 50.3, 50.n. The control unit 5 is connected with each battery chamber 1.1, 1.2, 1.3, 1.n via sensors 2.1, 2.2, 2.3, 2.n; 4.1, 4.2, 4.3, 4.n. Each sensor 2.1, 2.2, 2.3, 2.n is a temperature sensor and makes thermal contact with the battery to be charged. Each sensor 4.1, 4.2, 4.3, 4.n is designed to detect battery voltage. The sensors can be switched by the control unit 5 via switches via conductors 52.1, 52.2, 52.3, 52.n; 54.1, 54.2, 54.3, 54.n so that, in the most elementary case, each sensor can be switched off and on by the control unit 15.

In another embodiment of the invention, additional sensors such as a current sensor or a pressure sensor are used to measure other battery parameters.

Figure 3:
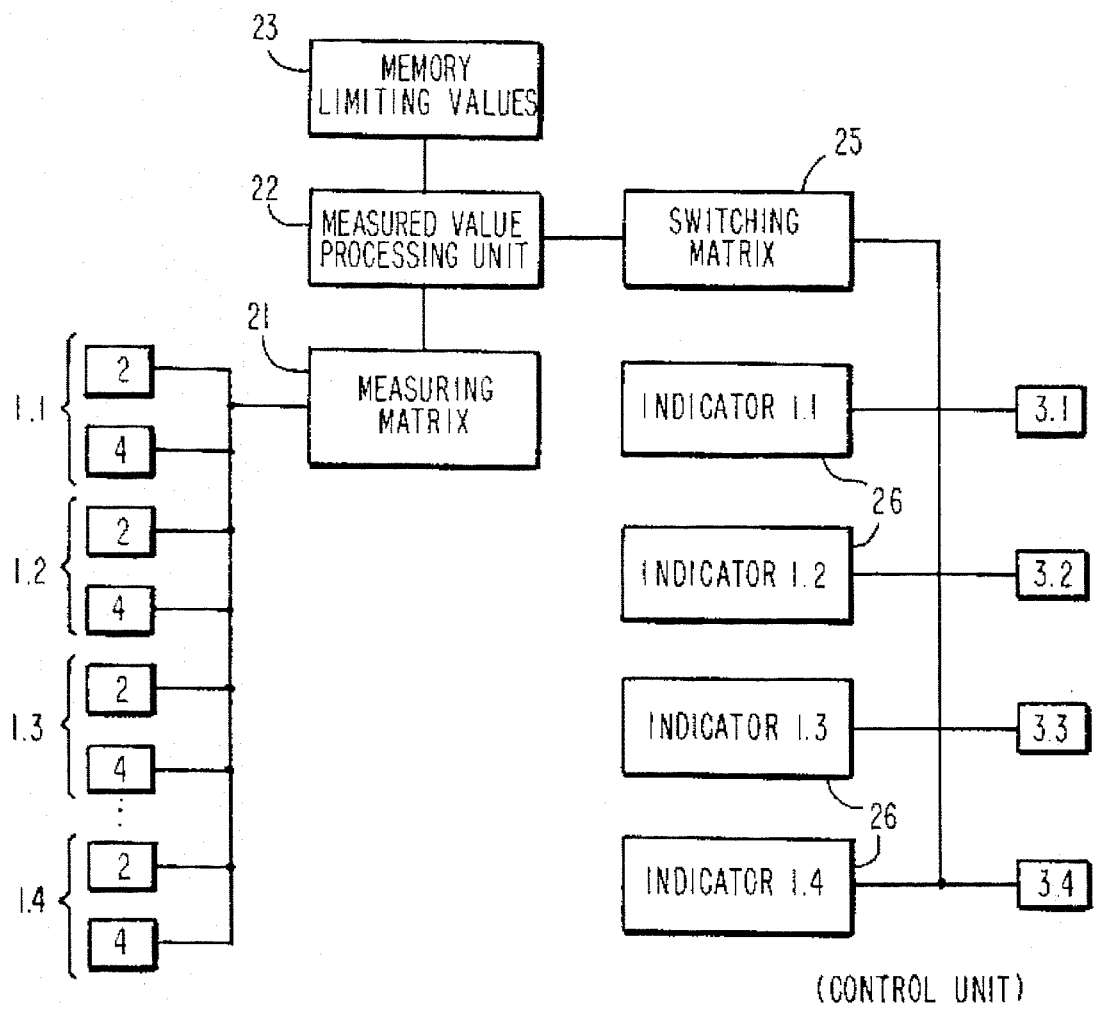
FIG. 3 is a block diagram of the control means of the device for charging rechargeable batteries according to the invention.

In a preferred embodiment shown in FIG. 3, the sensors 2.1, 2.2, 2.3, 2.n; 4.1, 4.2, 4.3, 4.n switches (not shown), are combined with the control unit 5. The lines of the sensors 2, 4 are guided to a measuring matrix 21 which is connected with a measured value processing unit 22. The measuring matrix 21 contains switching transistors which are connected with each sensor and which detect the measurement signals of the sensor 2.1, 4. For example, sensor 2 has a NTC resistor as a temperature sensor. NTC resistors change their resistance value as a function of temperature so that the temperature of the battery can be determined indirectly by measuring the resistance value or the dropping voltage across the resistance, since the sensor has thermal contact with the battery. In the most elementary case, the sensor 4.1 can have a connection terminal at the battery to be charged so that the voltage applied to the battery is fed to the measured value processing unit 22 via the measuring matrix 21. The measured value processing unit 22 compares the measured values with limiting values stored in memory 23. In its simplest form, the measured value processing unit 22 can contain one or more comparators in which predetermined limiting values for the individual parameters are entered. However, a microcomputer which compares the limiting values contained in the memory 23 with the measured values of the sensors 2.1, 2.2, 2.3, 2.4; 4.1, 4.2, 4.3, 4.4 can also be included in the processing unit 22 to control the charging process according to the methods described below in connection with FIG. 4.

A switching matrix 25 is connected to the measured value processing unit 22, the control inputs of the electronically controllable switch devices 3.1, 3.2, 3.3, 3.n being connected to the output of the switching circuit 25. Further, the switching circuit 25 controls the indicators 26 associated with the battery chambers for showing measured values such as battery voltage and temperature. A commercially available microcomputer having appropriate devices for storing data and input ports and output ports is used for controlling the measured value processing unit 22. The microcomputer is controlled by a program such as that shown in the flow chart in FIG. 4.

Figure 4:
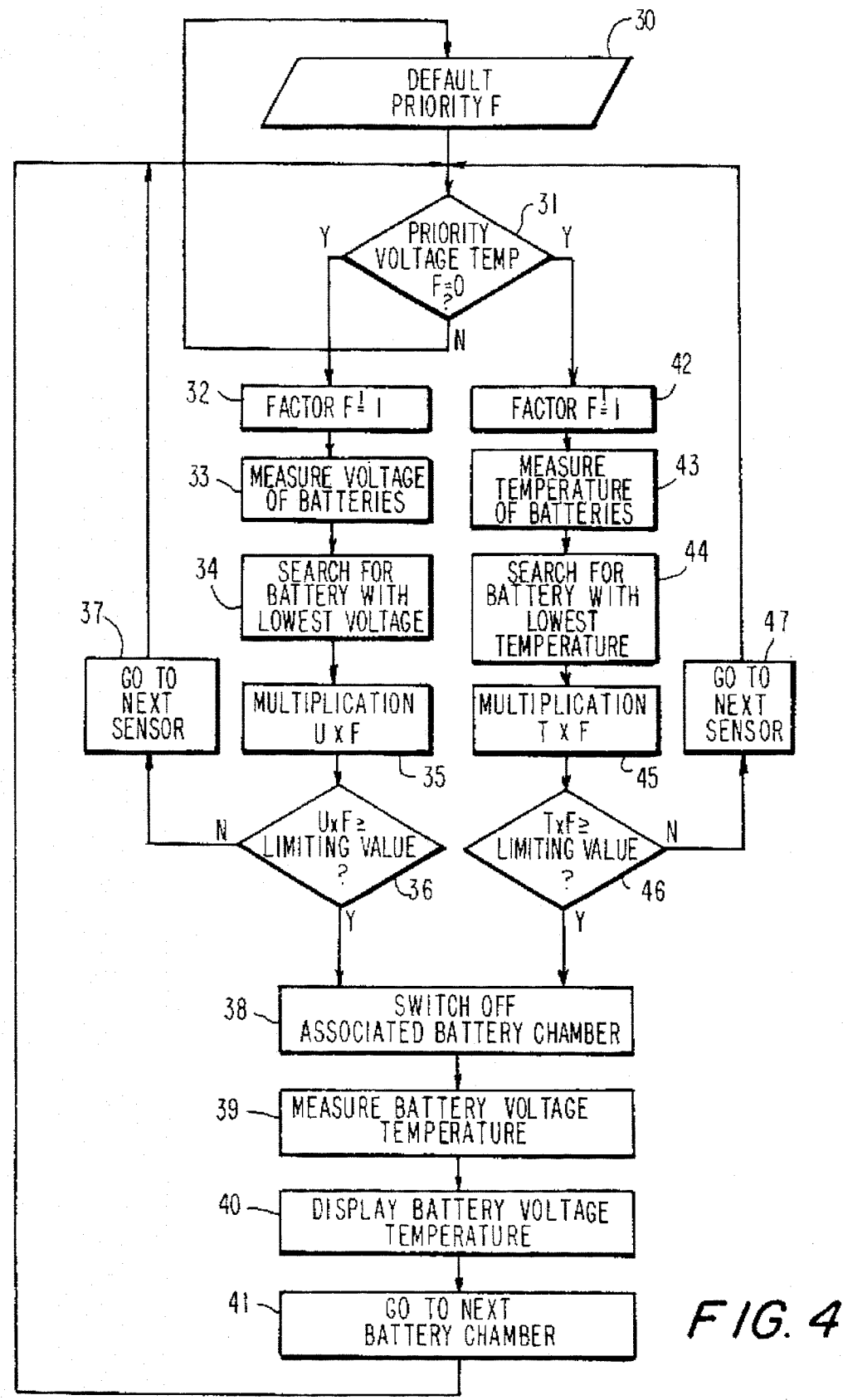
FIG. 4 is a flow chart showing a preferred method for the charging of a group of rechargeable batteries by comparison of a combined measured parameter weighted according to a priority factor with one or more limiting values.

The operation of the multiple charging device is described in the following with reference to FIG. 4. At position 30, priority F determines whether the voltage or the temperature of the battery will be given preference for evaluation. This preference can be selected by a simple switch so that it can also be changed in individual cases. However, it can also be a fixed setting to ensure a determined characteristic of the charging device, in particular the quick-charging operation.

At position 31, the control unit 5 asks which parameter is to be given priority. If no priority is chosen, the program jumps back to the default setting in position 30 via the loop. However, if voltage measurement is given priority, the program jumps to position 32 and sets the priority factor F=1. At position 33, the battery voltage is measured and, at position 34, that battery is selected which has the lowest voltage of all batteries to be charged. When this battery is found, the voltage value U of the battery is multiplied by the priority factor F=1 at position 35. Inquiry 36 checks whether or not the allowed limiting value stored in the data memory 23 has been reached or exceeded. If this value has not been reached or exceeded, the next sensor is switched on at position 37 by the measuring matrix 21 and this loop begins again at position 31 with an inquiry for priority which may have changed in the interim.

However, if the limiting value has been exceeded, i.e., if the predetermined charge voltage of the battery has been reached, this battery is switched off at position 38. This concludes the charging process for this battery. At position 39, the voltage and/or temperature of the battery is measured for monitoring purposes and indicated at position 40. At position 41, the program then jumps to the next battery chamber and the program starts again from the beginning at position 31. If there is no battery in the next battery chamber, the next battery chamber after that is selected, and so forth.

However, if temperature is the default priority parameter at position 30, the inquiry is carried out again at position 31 and factor F=1 is determined at position 42 in a manner analogous to the process described above. The temperature of the batteries is measured at position 43 and the battery with the lowest temperature T is found at position 44 and the charging process is begun with this battery. At position 45, the measurements taken from this battery are multiplied by the multiplication factor and an inquiry is effected at position 46 as to whether or not the allowed limiting value has been exceeded. If it has not been exceeded, the next sensor is triggered via position 47 and the procedure starts again from the beginning at position 31. However, if the limiting value has been exceeded, the battery chamber is switched off at position 38. Positions 39 to 41 are then run through as described above.

The priority factor F can be any optional number and is advisably selected in such a way as to enable the simplest possible data processing.

Figure 2:
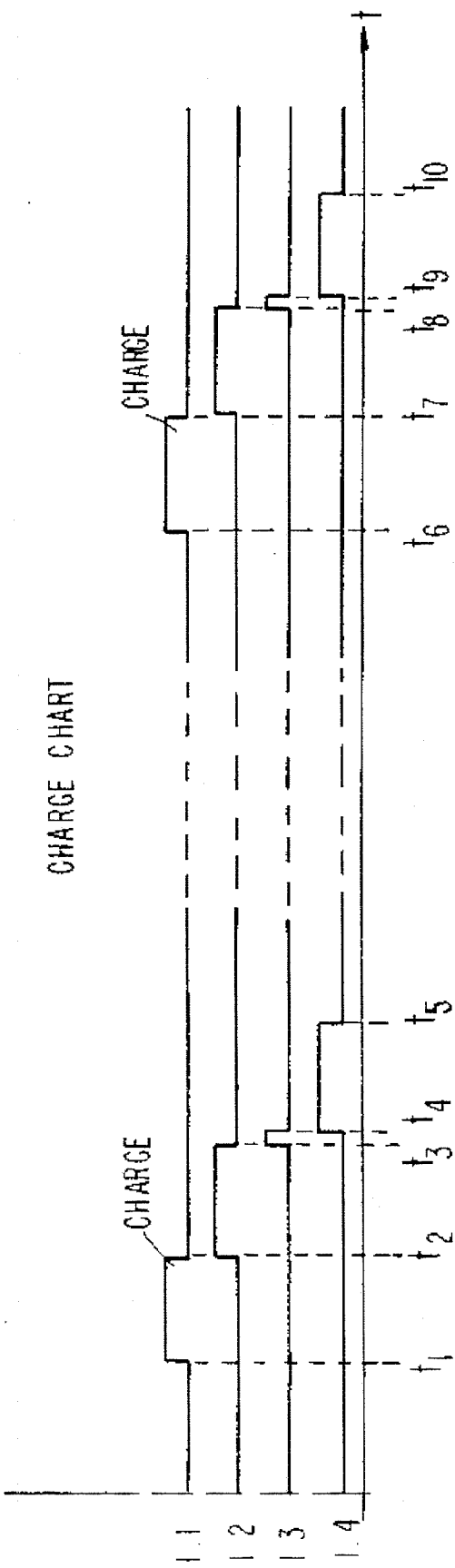
FIG. 2 is a graphical illustration of voltage versus time in a sequential method of charging rechargeable batteries performed by a device for charging four rechargeable batteries according to the invention.

FIG. 2 is a charging chart showing the cyclical charging times and interrupt times. The charging operations (voltage is switched on or off) for the individual battery chambers are shown one above the other on the ordinate of the graph. For example, battery chamber 1.1 is switched on at time t1 and the battery located in this battery chamber 1.1 is charged at time t2. At time t2, for example, temperature T has exceeded its limiting value so that this battery chamber is switched off according to FIG. 4 (position 38). The battery chamber 1.2 is then switched on at time t2 until time t3 when it is switched off. Battery chamber 1.3 is then briefly switched on at time t4 and then immediately switched off again at time t4 after it has been detected that no battery is inserted in the battery chamber. The next battery chamber 1 .n is then switched on and its battery is charged until it is switched off at time t5. This cycle is repeated from time t6 to time t10, since the battery located in chamber 1.1 has cooled off enough in the interim to be switched on again at time t6. The same process is followed with the other batteries. When every battery has reached its required voltage, the charging process is switched off entirely or is switched to charge maintenance.

In this way, as many batteries can be charged as desired. However, in a further development of the invention the batteries can also be charged in parallel, in which case suitable regulators are provided, if necessary, to regulate the charging current of the individual batteries and the charging current must be increased appropriately for quick charging.

In a further development of the invention, other parameters such as power consumption of a battery, discharging current or the like parameters can be used in addition to the described parameters of battery voltage or battery temperature according to the suggested sequence.

I claim:

1. A charging device for charging a plurality of rechargeable batteries, said charging device comprising:
   a plurality of battery chambers, each of said battery chambers including means for holding one of said rechargeable batteries;
   at least two sensors associated with each of said rechargeable batteries, each of said at least two sensor devices including means for measuring a measurable parameter of said rechargeable battery associated therewith;
   switchable means for electrically connecting at least one of said rechargeable batteries at a time for charging;
   control means for selecting said rechargeable batteries for charging in an order determined by measured values of said measurable parameters obtained from said at least two sensors associated with each of said rechargeable batteries,
   wherein said control means includes means for weighting said measured parameters of each of said rechargeable batteries according to a predetermined priority factor to obtain weighted combined values, means for comparing said weighted combined values of said measured parameters to at least one predetermined limiting value to determine said order in which said rechargeable batteries are selected for charging and means for controlling said switchable means to connect said rechargeable batteries for charging according to said order.

2. The charging device as defined in claim 1, wherein said switchable means for electrically connecting said at least one of said rechargeable batteries at a time for charging includes means for connecting all of said rechargeable batteries in parallel to each other for charging and said control means includes means for interrogating said at least two sensors of each of said rechargeable batteries one after the other to obtain said measured parameters for each of said rechargeable batteries.

3. The charging device as defined in claim 1, wherein said control means includes means for switching off a charging voltage in each of said battery chambers in which one of said rechargeable batteries is not held therein.

4. The charging device as defined in claim 1, wherein one of said at least two sensors for each of said rechargeable batteries measures battery voltage.

5. The charging device as defined in claim 1, wherein one of said at least two sensors for each of said rechargeable batteries measures battery temperature.

6. The charging device as defined in claim 1, wherein said control means has means for starting a charging of said rechargeable batteries by charging one of said rechargeable batteries having a lowest temperature of all of said rechargeable batteries in said battery chambers, said lowest temperature being measured by one of said at least two sensors.

7. The charging device as defined in claim 1, wherein said control means includes means for beginning a charging of said rechargeable batteries by charging one of said rechargeable batteries in said battery chambers having a lowest voltage of all of said rechargeable batteries in said battery chambers as determined by one of said at least two sensors for each of said rechargeable batteries.

8. The charging device as defined in claim 1, further comprising a quick-charging power supply for quick-charging of said rechargeable batteries connectable by said control means and said switchable means with said rechargeable batteries, said quick-charging power supply including means for recharging at least one of said rechargeable batteries in minutes.

9. The charging device as defined in claim 1, which is pocket-sized and portable.

* * * * *